Patented Nov. 5, 1935

2,019,808

UNITED STATES PATENT OFFICE 2,019,808

DETOXIFIED POLLEN EXTRACT

Edgar B. Carter, Highland Park, Ill., assignor to Abbott Laboratories, North Chicago, Ill., a corporation of Illinois No Drawing. Application October 8, 1932, Serial No. 636,939

11 Claims. (Cl. 167—78)

My invention relates to the preparation of detoxified pollen extracts which are used in the desensitization or the treatment of patients who are suffering from hay-fever.

I have discovered that the toxic part of the pollen extract may be detoxified by treating the extract with formalin, methenamine or other formaldehyde derivatives or compounds and that the extract so treated still retains its power to desensitize the patient and thus protect him from the symptoms of hay-fever.

The desensitization of patients who suffer from hay-fever is usually accomplished by the administration of intracutaneous, subcutaneous, or intramuscular injections of the extract of the pollens to which the patient is sensitive. Because of the extreme toxicity of the pollen extract to the hay-fever patient, it is necessary to begin the treatment with very weak doses, representing minute amounts of the pollen substance, and to gradually increase the strength of these doses until the patient is taking doses representing large amounts of the pollen substance. This procedure requires a large number of doses of gradually increasing strength. From ten to twenty doses are generally used.

Speaking in simple terms, I may say that the last few doses, representing large quantities of pollen substance, are the ones which desensitize and protect the patient from the pollen which he encounters in the air during the hay-fever season. In order to give him these strong doses it is necessary to prepare his system by gradually building up his tolerance to the pollen substance through the injection of numerous doses of gradually increasing strength.

According to my invention it is possible to so treat the pollen extract as to remove the extreme toxicity without destroying the desensitizing properties and thus to enable the physician to administer a few doses of the detoxified extract representing large quantities of the pollen substance, and thereby protect his patient from hay-fever symptoms. This detoxified pollen extract has been successfully used as a preseasonal treatment before the hay-fever symptoms have developed, and as a co-seasonal treatment for the relief of hay-fever symptoms after they have already appeared.

As an example of the detoxifying process, I add to the liquid pollen extract about 0.1% of formalin containing 40% formaldehyde or an amount of methenamine or other formaldehyde preparations representing an equivalent amount of formaldehyde. The extracts so treated are preferably held in an incubator at about 37.5° C. for a period of time, usually about two weeks, and the resulting extract is then ready for the biological tests and for administration to the patients. I have likewise prepared such detoxified pollen extract by using methenamine and paraformaldehyde (trioxymethylene).

Modifications coming within the spirit of my invention will doubtless suggest themselves to those skilled in the art. Hence, I do not wish to be limited to the embodiments disclosed above or uses mentioned except as indicated by the appended claims, which are to be interpreted as broadly as the state of the art will permit.

I claim as my invention:

1. A method of detoxifying an extract of pollen, comprising adding formaldehyde to said extract and incubating the same.

2. A method of detoxifying an extract of pollen, comprising adding to said extract a weak concentration of formaldehyde and then incubating the material.

3. A method of detoxifying an extract of pollen, comprising adding to said extract less than one-tenth of one per cent of formaldehyde, and incubating the material at a temperature of about thirty-seven degrees C. for approximately two weeks.

4. An active pollen extract detoxified by incubating in the presence of a formaldehyde-liberating substance.

5. An active pollen extract detoxified by incubating in the presence of formaldehyde.

6. A method of detoxifying an extract of pollen, comprising adding to said extract a member of the group consisting of formaldehyde, paraformaldehyde, and methenamine, and incubating the mixture.

7. A method of detoxifying an extract of pollen, comprising adding to said extract paraformaldehyde, and incubating the mixture.

8. A method of detoxifying an extract of pollen, comprising adding methenamine to said extract, and incubating the mixture.

9. An active pollen extract detoxified by incubating in the presence of a member of the group consisting of formaldehyde, paraformaldehyde, and methenamine.

10. An active pollen extract detoxified by incubating in the presence of paraformaldehyde.

11. An active pollen extract detoxified by incubating in the presence of methenamine.

EDGAR B. CARTER.